(12) United States Patent
Tomlinson et al.

(10) Patent No.: US 11,097,187 B1
(45) Date of Patent: Aug. 24, 2021

(54) CONSULTATION BOT PLATFORM

(71) Applicant: Electronic Arts Inc., Redwood City, CA (US)

(72) Inventors: Matthew Douglas Tomlinson, Cedar Park, TX (US); Michael Arleth Pedersen, Austin, TX (US); Dennis Kotsch, Galway (IE); Zoltan Erdei, Galway (IE)

(73) Assignee: Electronic Arts Inc., Redwood City, CA (US)

( * ) Notice: Subject to any disclaimer, the term of this patent is extended or adjusted under 35 U.S.C. 154(b) by 316 days.

(21) Appl. No.: 16/047,905

(22) Filed: Jul. 27, 2018

(51) Int. Cl.
*A63F 13/30* (2014.01)
*A63F 13/70* (2014.01)
*H04L 29/06* (2006.01)

(52) U.S. Cl.
CPC .............. *A63F 13/30* (2014.09); *A63F 13/70* (2014.09); *H04L 67/38* (2013.01); *A63F 2300/40* (2013.01); *A63F 2300/57* (2013.01); *H04L 67/42* (2013.01)

(58) Field of Classification Search
USPC .......................................................... 705/304
See application file for complete search history.

(56) References Cited

U.S. PATENT DOCUMENTS

| | | | |
|---|---|---|---|
| 2009/0063463 A1* | 3/2009 | Turner .................... | A63F 13/80 |
| 2010/0169148 A1* | 7/2010 | Oberhofer ............. | G06Q 10/06 |
| | | | 705/7.13 |
| 2014/0270137 A1* | 9/2014 | Steiner ................ | H04M 3/5175 |
| | | | 379/265.05 |

(Continued)

FOREIGN PATENT DOCUMENTS

WO WO-2013103696 A2 * 7/2013 ........... H04M 3/5191

OTHER PUBLICATIONS

Green, Adam, "Minecraft Players can get paid big money from Microsoft," [online] Komando, published on Apr. 25, 2018, available at: < https://www.komando.com/lifestyle/minecraft-players-can-get-paid-big-money-from-microsoft/456678/ > (Year: 2018).*

(Continued)

*Primary Examiner* — Richard W. Crandall
(74) *Attorney, Agent, or Firm* — McDermott Will & Emery LLP

(57) ABSTRACT

Methods and systems for a consultation bot platform are provided. In one aspect, a method includes receiving an input indicating a request for assistance for an issue occurring in a video game. The method also includes determining a category associated with the request for assistance. The method also includes determining whether a score associated with a second-user for the category satisfies a threshold score and adding the second-user to a set of second-users in response to the score satisfying the threshold score. The method also includes selecting a first second-user from the set of second-users. The method also includes initiating a communication channel between the first user and the first second-user. The method also includes transferring messages between the first user and the first second-user. The method also includes generating a quality score for the request for assistance based on messages transferred between the first user and the first second-user.

20 Claims, 4 Drawing Sheets

(56) References Cited

U.S. PATENT DOCUMENTS

| | | | | |
|---|---|---|---|---|
| 2014/0357352 | A1* | 12/2014 | Van Luchene | A63F 13/55 463/29 |
| 2018/0005246 | A1* | 1/2018 | Basam | G06Q 30/016 |
| 2019/0012747 | A1* | 1/2019 | Antonelli | G06Q 30/0282 |

OTHER PUBLICATIONS

"News clip: Classic 1991 NES footage with NWC champ Robin Mihara; Nintendo game counselors," youtube.com [online], posted on Jun. 2, 2009, available at: < https://www.youtube.com/watch?v=QZroKmkVGxk > (Year: 2009).*

Stackoverflow.com, C# (Objective C) forum, "What are the users of circular buffer?" published in 2010, available at: < https://stackoverflow.com/questions/2553637/what-are-the-uses-of-circular-buffer > (Year: 2010).*

* cited by examiner

CONSULTATION BOT PLATFORM

TECHNICAL FIELD

The present disclosure generally relates to a consultation bot platform, and more specifically relates to matching users and establishing a virtual communication session between the users.

BACKGROUND

Customers of a product generally call into a customer care center to resolve an issue they are facing with the product. The first worker at the customer care center may have to reach out to second worker at the customer care center who is more familiar with the issue that the customer is facing. However, existing systems fail to provide an efficient system to identify the second person at the customer care center who is more familiar with the issue the customer is facing. This leads to longer wait times for the customer to have his or her issue resolved. Additionally, existing systems fail to sufficiently monitor and identify one or more workers that are more familiar with a particular issue, which results in inaccurate data regarding the competencies associated with the workers at the customer care center. Such inaccurate data further leads to inefficient identification of customer care workers with solutions for an issue.

SUMMARY

The present disclosure provides for a communication method that notifies various stakeholders of project in real-time and selects a communication channel determined to be most efficient in successfully coordinating on the execution of the project.

Accordingly to one embodiment of the present disclosure, a computer-implemented method is provided. The method includes receiving, from a device of a first user, an input indicating a request for assistance for an issue occurring in a virtual environment, where the first user is associated with a first tier level. The method also includes determining a category associated with the request for assistance, where the category is associated with an aspect of gameplay of the video game. The method also includes, for each second-user among multiple second-users, determining whether a score associated with the second-user for the category satisfies a threshold score, where each of the second-users is associated with a different tier level than the first user. The method also includes, in response to determining that the score satisfies the threshold score, adding the second-user to a set of second-users. The method also includes selecting a first second-user from the set of second-users. The method also includes initiating a communication channel between the first user and the first second-user. The method also includes transferring one or more messages between the first user and the first second-user. The method also includes generating a quality score for the request for assistance, based on the one or more messages transferred between the first user and the first second-user.

Accordingly to one embodiment of the present disclosure, a non-transitory computer readable medium is provided including instructions that, when executed by a processor, cause the processor to perform a method. The method includes receiving, from a device of a first user, an input indicating a request for assistance for an issue occurring in a virtual environment, where the first user is associated with a first tier level. The method also includes determining a category associated with the request for assistance, where the category is associated with an aspect of gameplay of the video game. The method also includes, for each second-user among multiple second-users, determining whether a score associated with the second-user for the category satisfies a threshold score, where each of the second-users is associated with a different tier level than the first user. The method also includes, in response to determining that the score satisfies the threshold score, adding the second-user to a set of second-users. The method also includes selecting a first second-user from the set of second-users. The method also includes initiating a communication channel between the first user and the first second-user. The method also includes transferring one or more messages between the first user and the first second-user. The method also includes generating a quality score for the request for assistance, based on the one or more messages transferred between the first user and the first second-user.

According to one embodiment of the present disclosure, a system is provided that includes means for storing instructions, and means for executing the stored instructions that, when executed by the means, cause the means to perform a method. The method includes receiving, from a device of a first user, an input indicating a request for assistance for an issue occurring in a virtual environment, where the first user is associated with a first tier level. The method also includes determining a category associated with the request for assistance, where the category is associated with an aspect of gameplay of the video game. The method also includes, for each second-user among multiple second-users, determining whether a score associated with the second-user for the category satisfies a threshold score, where each of the second-users is associated with a different tier level than the first user. The method also includes, in response to determining that the score satisfies the threshold score, adding the second-user to a set of second-users. The method also includes selecting a first second-user from the set of second-users. The method also includes initiating a communication channel between the first user and the first second-user. The method also includes transferring one or more messages between the first user and the first second-user. The method also includes generating a quality score for the request for assistance, based on the one or more messages transferred between the first user and the first second-user.

According to one embodiment of the present disclosure, a system is provided including a memory storing sequences of instructions, and a processor configured to execute the sequences of instructions, which when executed, causes the processor to perform receiving, from a device of a first user, an input indicating a request for assistance for an issue occurring in a virtual environment, where the first user is associated with a first tier level. The execution of the sequences of instructions also causes the processor to perform determining a category associated with the request for assistance, where the category is associated with an aspect of gameplay of the video game. The execution of the sequences of instructions also causes the processor to perform, for each second-user among multiple second-users, determining whether a score associated with the second-user for the category satisfies a threshold score, where each of the second-users is associated with a different tier level than the first user. The execution of the sequences of instructions also causes the processor to perform, in response to determining that the score satisfies the threshold score, adding the second-user to a set of second-users. The execution of the sequences of instructions also causes the processor to perform selecting a first second-user from the set of second-users. The execution of the sequences of instructions also causes the processor to perform initiating a communication channel between the first user and the first second-user. The execution of the sequences of instructions also causes the processor to perform transferring one or more messages between the first user and the first second-user. The execution of the sequences of instructions also causes the processor to perform generating a quality score for the request for assistance, based on the one or more messages transferred between the first user and the first second-user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings.

Figure 1:
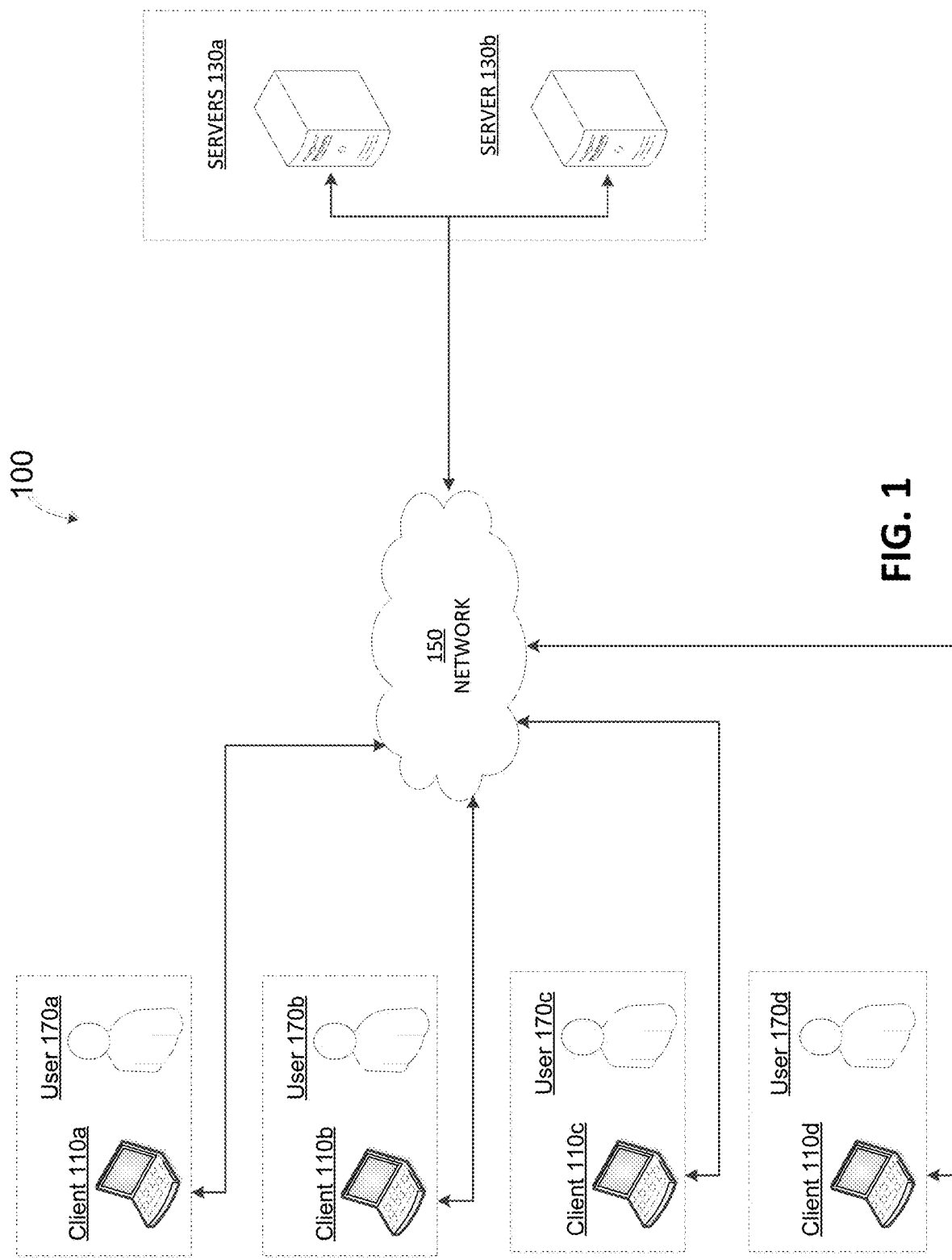
FIG. 1 illustrates an example architecture for a consultation bot platform.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

In a customer care environment, there are usually at least two tiers of customer care advisors. A first tier of customer care advisor receives issues from a customer of a product, and if the first tier customer care advisor is not able to help, then he or she may request assistance from a second tier customer care advisor, who may be more familiar with the issue. Generally, a first available second tier customer care advisor may be selected or a second tier customer care advisor may volunteer to help. However, such methods are not efficient for multiple reasons, for example, that first available second tier customer care advisor or the customer care advisor that volunteered may not have sufficient amount of experience with that issue and it may be more efficient and faster to wait for another second tier customer care advisor to be available.

The techniques, methods, and systems described herein address a problem of efficient resource allocation in communication systems, which is a problem specifically arising in the realm of computer technology. The techniques, methods, and systems described herein address the problem by providing a solution also rooted in computer technology, namely by efficient data utilization associated with one or more nodes or users of the communication systems for efficient resource allocation between the users of the communication systems.

The disclosed techniques and methods described herein provide for a consultation bot platform that efficiently utilizes data associated with one or more nodes or users of the communication systems and matches a user of the platform associated with a first tier level with a user of the platform associated with a second tier level and establishes communication channel between the two users of the platform. The techniques and methods described herein for the consultation bot platform also provide for the user associated with a first tier level to provide input that he or she is requesting assistance. After receiving the input, the techniques and methods described herein determine a category for the request. Based on the category, the techniques and methods described herein identify a set of users associated with a second tier that are associated with the determined category. The techniques and methods described herein rank the set of users associated with the second tier based on a number of factors. For example, the set of users associated with the second tier may be ranked based on their rating for the determined category. A user from the set of users associated with the second tier is selected and a communication channel is initiated between the user associated with the first tier and the selected user, associated with the second tier. Thereby allowing a customer care advisor associated with a second tier to be more efficiently matched with a customer care advisor associated with a first tier.

Example System Architecture

FIG. 1 illustrates an example architecture 100 for a consultation bot platform that matches users associated with different tier levels with each other for a consultation session. As described herein, a "bot" is any computing system that provides a response to a user input. The architecture 100 includes clients 110a, 110b, 110c, 110d, generally referred to herein as clients 110, and servers 130a, 130b, generally referred to herein as servers 130 connected over a network 150. Users 170a, 170b, 170c, 170d, generally referred to herein as users 170, interact with respective clients 110 and transmit data, including instructions, to servers 130.

Servers 130 may be configured to be cloud computing servers that provide platform-as-a-service (PaaS) and/or software-as-a-service (SaaS) services. Examples of platforms and/or software hosted by the servers 130 include, but are not limited to, applications configured for matching two users 170 of the platform and communication between the two matched users 170 of the platform, generally referred to herein as a "consultation bot platform application." The platforms use data related to the users 170. Examples of data related to users 170 includes, but are not limited to, users 170 account information, such as user identifiers, and other preferences associated with the users 170, and the like. Preferences data associated with users 170 may be stored in a data storage unit of the server 130 or a data storage unit coupled to the server 130. In some implementations, for purposes of load balancing, multiple servers 130 may host the above described applications and data. The servers 130 can be any devices having an appropriate processor, memory, and communications capability for hosting data and video game applications including hosting video game applications as a service.

The clients 110 include one or more computing devices, including but not limited to, mobile devices (e.g., a smartphone or PDA), tablet computers, laptop computers, desktop computers, and/or other devices capable of running a consultation bot platform application. In some implementations, the clients 110 may include a storage medium that includes logic to provide authentication of a user 170 credentials to provide access to the consultation bot platform application. In some implementations, the consultation bot platform application provided by the client 110 may be executable by one or more processors of the client 110. The consultation bot platform application or instances of consultation bot platform application may each individually be stored on media, such as flash memory, stead-state memory, removable media storage, or other storage media. In some implementations, instances of the consultation bot platform application may be downloaded and stored on storage media of the clients 110. The clients 110 are configured to transmit data to the servers 130 in response to inputs received from users 170. In some implementations, clients 110 are configured to download data associated with the user 170 and stored on the servers 130, upon starting the instance of the consultation bot platform application being hosted on the client 110.

A consultation bot platform application should be understood to include software code that the client 110 uses to provide an interface, such as a graphical user interface (GUI), with which a user interacts. A consultation bot platform application may include software code that informs the client 110 of processor instructions to execute, but may also include data used during communication between two or more users 170, such as data relating to the users account names, identifiers, login status, whether one or more users 170 joined a communication channel created for the communication between the two or more users 170, whether one or more users 170 accepted the invitation to join the communication channel, icons selected by users 170 to represent their on-line avatars, and other such data. A user 170 interacts with the consultation bot platform application and the client 110 through user input/output (I/O) devices. The clients 110 may each execute a separate instance of a consultation bot platform application. Additional details of clients 110 are described below with reference to FIG. 2.

The clients 110 and the servers 130 are communicatively coupled to each other over the network 150. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example System for Consultation Bot Platform

Figure 2:
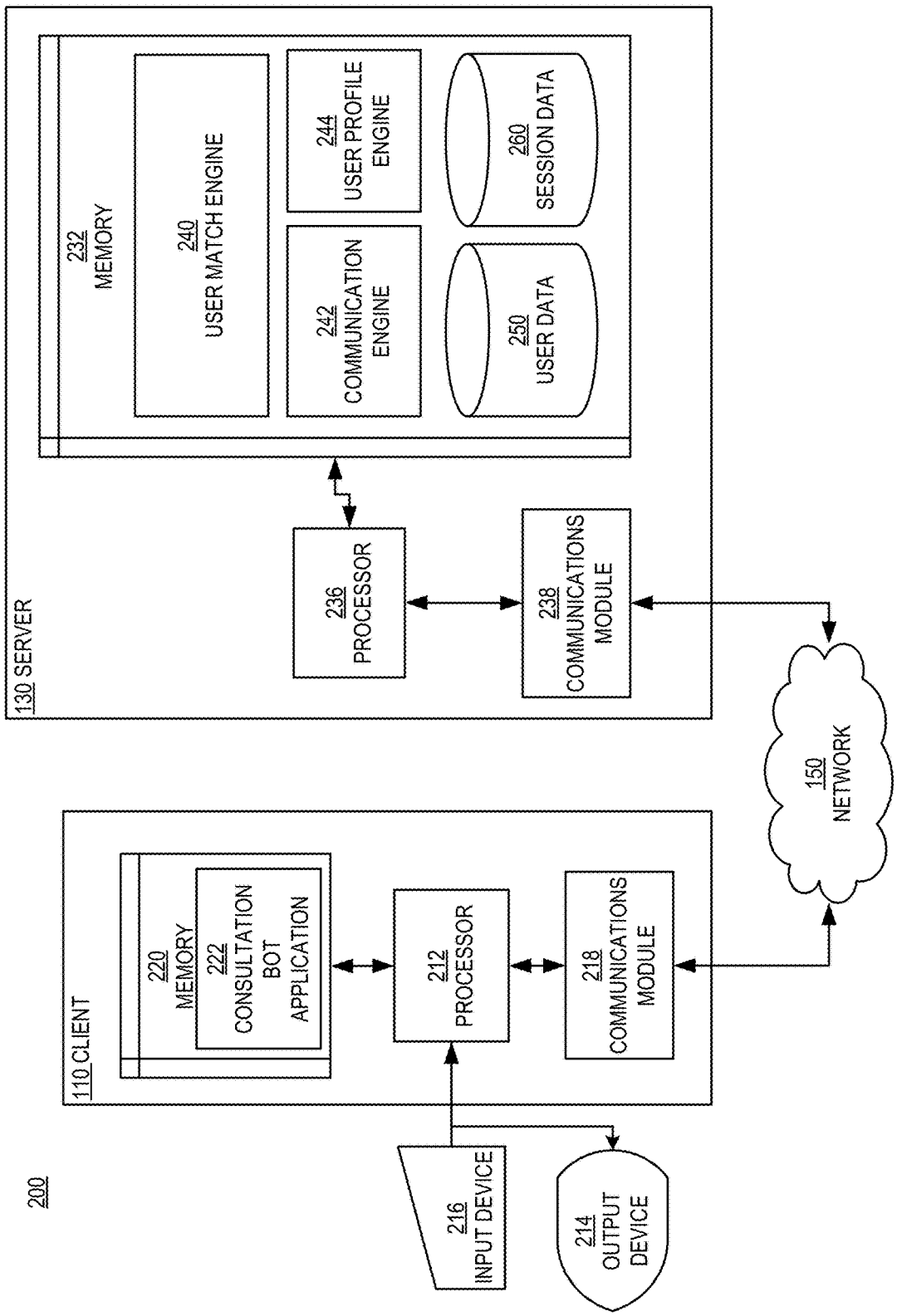
FIG. 2 is a block diagram illustrating the example clients and servers from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a memory 232, a processor 236, and a communications module 238. The memory 232 of the server 130 includes a user match engine 240, a communication engine 242, a user profile engine 244. The processor 236 of the server 130 is configured to execute instructions, such as instructions physically coded into the processor 236, instructions received from software in the memory 232, or a combination of both. The user match engine 240 receives inputs from users 170 via clients 110 over the network 150. Examples of inputs received by the user match engine 240 include, but are not limited to, receiving user input data related to user login information, such as a username, a password, and the like. User input data includes data related to inputs from a user that specify that the user is requesting assistance for an issue that a player of a video game is experiencing. The issue may be associated with a category and/or a sub-category of issues. In some implementations, these categories and/or sub-categories may be pre-determined. The requests for assistance from users 170 may be stored in a data storage unit coupled with the server 130. In some implementations, the user match engine 240 may be configured to generate categories and/or sub-categories based on a number of historical requests for assistance from users 170. For example, if the user match engine 240 receives a threshold number of requests for a particular type of issue over a threshold period of time, then the user match engine 240 may be configured to create a category or sub-category for that type of issue.

For each request for assistance received, the user match engine 240 may be configured to present a GUI on the client 110 of the user 170 that sent the request for assistance, where the GUI includes graphical icons or text boxes for the user 170 to select or describe a category and/or a sub-category to associate with the request for assistance. In some implementations, the user match engine 240 may present a generated category or sub-category as a graphical icon for the user 170 to select if appropriate for that request for assistance. Each request for assistance is associated with a category and/or a sub-category, and the user match engine 240 may be configured to determine the category and/or sub-category of the request for assistance when received. Examples of categories include, but are not limited to, transactions that may occur within the video game, referred to herein as "in-game transactions," various aspects of the gameplay of the video game, rules of the video game, user account billing for one or more services provided by the video game, and/or technology of the videogame. Each request for assistance is associated with a unique identifier and the user match engine 240 may be configured to identify the unique identifier associated with the request. In some implementations, the user match engine 240 generates a unique identifier for a request for assistance and associates the request for assistance with the generated unique identifier.

An additional example of categories for assistance may include managing a player's account, including the player's account and billing details. Some of the sub-categories of assistance requested for this category include, but are not limited to, hacked account, managing account security settings, changing or recovering account password, changing email address associated with the account, purchases made using the account, redemption of any offline or online code for certain value or resources of the video game, player identity management, other account security issues, and the like. Another example of categories for assistance may include in-game help or game information. Some of the sub-categories of assistance requested for this category include, but are not limited to, assistance with game modes, game features, game availability, tips and/or tricks in playing the video game, news related to the game, location of virtual and/or non-virtual items related or associated with the game, and the like.

In some implementations, the server 130 may be configured to provide one or more questions to the user 170 in response for the user 170 requesting assistance. The questions may be related to provide additional information for the type of assistance requested. In some implementations, the server 130 may be configured to determine the category and/or sub-categories to associate with the request for assistance based on inputs and/or responses to the questions provided by the user 170 that requested for assistance. In some implementations, the server 130 may be configured with one or more machine learning models and/or other artificial intelligence models that are trained to identify a category and/or sub-category based on the inputs provided by the user 170 to the questions of the server, and the server 130 may be configured to associate the request for assistance with the identified category and/or sub-category.

Based on the category and/or sub-category associated with the request, the user match engine 240 identifies a set of users 170 associated with the category and/or sub-category. As described above, each user 170 is associated with a particular tier level. The user match engine 240 may be configured to determine the tier level associated with the user 170 that sent the request for assistance, and identify a set of users 170 that are associated with a tier level greater than the tier level associated with the user 170 that sent the request for assistance. The user match engine 240 is configured to select a user 170 from the set of users 170 for a consultancy session with the user 170 that sent the request for assistance. Additional details on the matching of a user 170 from the set of users 170 associated with a higher tier level and the user 170 that sent the request 170 are described below with reference to FIG. 3.

The user match engine 240 is configured to initiate a communication channel between the user 170 that is selected from the set of users 170 and the user 170 that sent the request for assistance. The user match engine 240 may determine the unique identifiers associated with these users 170, such as a user identifier, a phone number, and the like, and establish a communication session between these users 170 using their unique identifiers. In establishing a communication channel between the users 170, the user match engine 240 may be configured to transfer a request to initiate the communication channel to the communication engine 242. The user match engine 240 may transfer the unique identifiers associated with users 170, described above, to the communication engine 242. In some implementations, the user match engine 240 may transfer the unique identifiers in the same message as the request message to initiate the communication channel between the users 170.

The communication engine 242 is configured to present GUIs configured to receive and display communications, referred to herein as "communication GUI," from one user 170 to another user 170 that are identified as users associated with a project. In some implementations, the communication engine 242 is configured to present communication suggestions to the users based on the messages being transmitted between the users 170, duration of the communication, time of the day at which the communication is occurring, and the like. For example, the communication engine 242 may present a "Hello!" message suggestion to the users at the beginning of a communication session. Similarly, the communication engine may present a "Goodnight!" message suggestion to the users if any of the other users 170 in the communication session sent a "Goodnight" message. The communication engine 242 may present other types of messages that indicate an action or an event that occurs during the communication session between the users. In some implementations, the communication engine 242 receives instructions from other modules or engines within server 130.

The user profile engine 244 is configured to generate and update a profile for a user 170 and store the profile data in a data storage unit, such as the user data repository 250. The profile of a user may include data related to login information of a user 170, such as a username, password, categories and sub-categories that a user 170 is associated with, a tier level associated with the user 170, and the like. In some implementations, the user profile engine 244 may associate with the profile of a user 170, the ratings for each category and/or sub-category associated with the user 170.

The client 110 includes a processor 212, the communications module 218, and the memory 220 that includes a consultation bot platform application 222. The consultation bot platform application 222 may be a streaming engine and/or simulation engine, or physically coded instructions that execute a consultation bot platform application, which when executed presents graphical user interfaces (GUI) for logging into the application, providing inputs to the server 130 that the user is requesting assistance for an issue, such as an issue in a virtual environment, for example a video game, receiving messages from server 130, communicating with other selected users 170 for assisting with the issue via a communication channel in a mode of communication selected for that communication session. The client 110 also includes an input device 216, such as a keyboard, mouse, touchscreen and/or the like, and an output device 214, such as a display. The processor 212 of the client 110 is configured to execute instructions, such as instructions physically coded into the processor 212, instructions received from software in the memory 220, or a combination of both. The processor 212 of the client 110 executes instructions from the consultation bot platform application 222 causing the processor 212 to transmit user inputs and data from the consultation bot platform application 222 to the server 130 via the communications module 218. The user 170, via the consultation bot platform application 222, being executed on client 110, interacts with the user authentication engine 240, the communication engine 242, the session management engine 244, and the user profile engine 246.

The techniques described herein may be implemented as method(s) that are performed by physical computing device(s), as one or more non-transitory computer-readable storage media storing instructions which, when executed by computing device(s), cause performance of the method(s), or, as physical computing device(s) that are specially configured with a combination of hardware and software that causes performance of the method(s).

Figure 3:
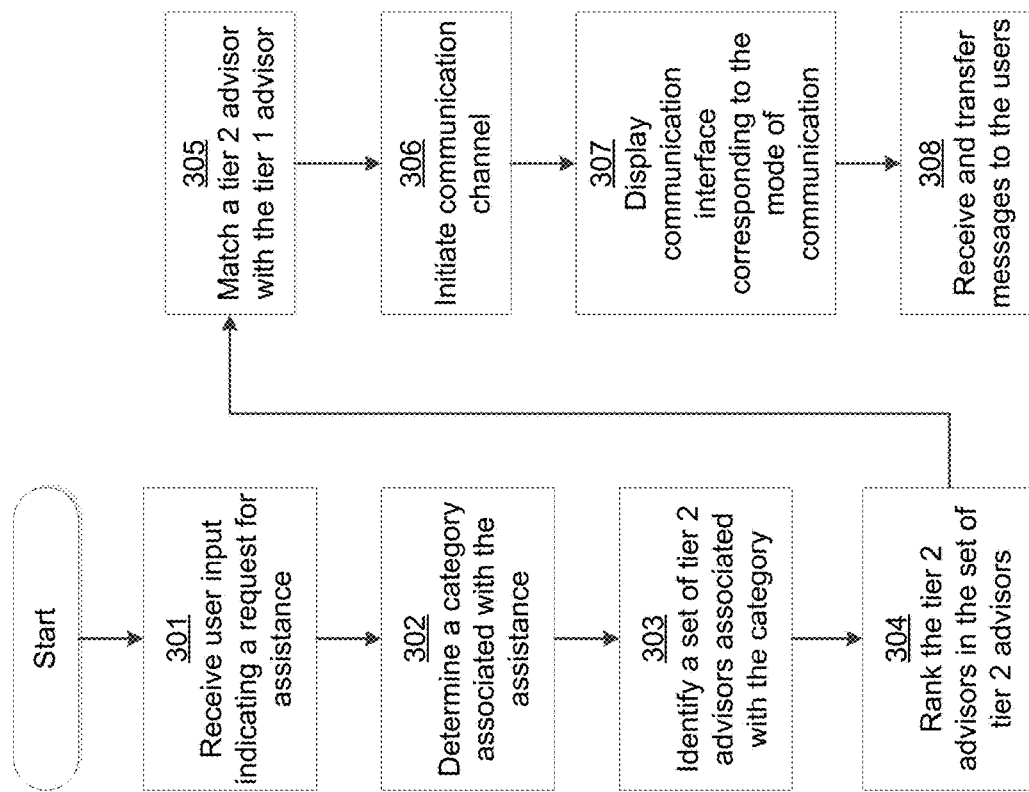
FIG. 3 illustrates an example process for a matching two users and establishing communication between two or more users using the example server of FIG. 2.

FIG. 3 illustrates an example process 300 of matching different users 170 associated with different tiers using a computing device executing an instance of the consultation bot application, such as client 110 executing consultation bot application 222 of FIG. 2. For explanatory purposes, the example process 300 is described herein with reference to the processors 212 and 236 of FIG. 2. However, the example process 300 is not limited to the processors 212 and 236 of FIG. 2, and one or more blocks of the example process 300 may be performed by one or more other components of the server 130, including user match engine 240, communication engine 242, user profile engine 244. Further for explanatory purposes, the blocks of the example process 300 are described herein as occurring in serial, or linearly. However, multiple blocks of the example process 300 may occur in parallel. In addition, the blocks of the example process 300 need not be performed in the order shown and/or one or more of the blocks of the example process 300 need not be performed. For purposes of explanation of the subject technology, the process 300 will be discussed in reference to FIG. 2.

At step 301, the user match engine 240 of server 130 receives a user input from a user 170, such as user 170a, that indicates that the user 170a is requesting assistance. The user 170a is associated with a particular tier level, such as tier 1. In some implementations, the request for assistance may be a message that includes data related to a category of assistance associated with the request. A category of assistance may be associated with one or more aspects of a video game. In some implementations, a category may have sub-categories that are associated with fewer aspects of the video game than a category. As described above, examples of categories include, but are not limited to, transactions that may occur within the video game, referred to herein as "in-game transactions," various aspects of the gameplay of the video game, rules of the video game, user account billing for one or more services provided by the video game, and/or technology of the videogame. Each request for assistance received by the server 130 may be associated with a unique identifier, and the server 130 may be configured to store the association between the unique identifier and the request in a data storage unit.

The input may be provided via graphical icon displayed in a consultation bot application on a client device 110, such as the consultation bot application 222. The server 130 may receive the user inputs from the client device 110, such as the client device 110a. The server 130 may present or cause a GUI, configured for user input, on a client, such as a client 110a in order to allow a user, such as user 170a, to make the selection that indicates that the user 170a is requesting for assistance. In some implementations, the server 130 may present or cause a GUI, configured to receive inputs for additional information associated with the request, on the client device 110. Additional information associated with the request may be information related to the player of the video game that is experiencing an issue, such a unique identifier of the player. The user 170 selections are transmitted to the server 130 via network 150. The requests for assistance, the user selections, and the like are stored in a storage unit, such as data store 250.

At step 302, in response to receiving the user input indicating a request for assistance, the user match engine 240 of the server 130 determines a category associated with the request. In some implementations, the user match engine 240 identifies sub-categories associated with the request. At step 303, the user match engine 240, identifies a set of users 170 that are associated with different tier level than the tier level associated with the user 170 that requested the assistance. For example the tier level associated with the set of users 170 may be a higher tier level than the tier level associated with the user 170 that requested the assistance. Profile data for each user 170 may identify one or more categories associated with that user 170, and the user match engine 240 may identify a set of users 170 associated with the different tier level based on the one or more categories associated with the user 170.

The user match engine 240 identifies the set of users 170 that are associated with a different tier level, based on ratings of the users 170 for that category. A rating of a user 170 for a category is based on previous assistance provided by that user 170 in that category. The rating may be provided the user 170 the provided the input for the request for assistance with that category. In some implementations, the rating of a user 170 associated with a different tier level may be updated based on the rating of the user 170 for that category previously provided by the user 170 that requested assistance for that category. For example, if user 170a requested assistance with a category previously and the user 170c provided assistance to the user 170a at that time, and user 170a gave a low rating to user 170c, then the next time user 170a requires assistance in that category, the user match engine 240, for identifying a set of users 170 that can assist user 170a, may lower the rating of the user 170c for that category due to the lower rating provided by the user 170a for the user 170c in that category. In some implementations, the rating of a user 170a may be based on the competency level of the video game, which may be an input provided by the user 170a. In some implementations, the server 130 may determine competency level of the video game of the user 170a based on ratings of assistance previously provided by the user 170a for issues in the video game. In some implementations, the rating of a user 170a may be based on the competency level or experience of the user 170a in dealing with a certain type of issue or category. For example, the server 130 may determine the number of similar type of issues or categories on which the user 170a previously provided assistance, and adjust a rating based on the determined number.

At step 304, the user match engine 240 ranks the identified set of users 170. The user match engine 240 may rank the identified set of users 170 based on the ratings of the users 170 for the category. In some implementations, the user match engine 240 ranks the identified set of users 170 based on number of open consultancies of that user 170. In one or more implementations, an open consultancy refers to a consultancy between users 170 that are associated with different tier levels and is pending or unresolved. The user match engine 240 may rank a user 170 lower based on a number of open consultancies of the user 170. In some implementations, the user match engine 240 may lower the rank of a user 170 if the number of open consultancies of the user 170 satisfies a threshold number of open consultancies. In some implementations, the user match engine 240 is configured to arrange users 170 associated with a tier level in a round robin model and selects a next available user 170 based on the model. For example, a set of users 170 associated with a certain tier level may be stored in a data structure that is implemented as a round robin model, such as a circular data buffer, and the user match engine 240 may be configured to track a next available user 170 within the circular buffer.

At step 305, the user match engine 240 matches the highest ranked user 170 among the identified set of users 170 with the user 170 that sent the request for assistance for a consultancy on the issue for which the assistance was requested. In some implementations, the user match engine 240 is configured to transfer a message to a user 170 among the identified set of users 170 indicating to that user 170 that he/she is selected for a consultancy with the user 170 that sent the request for assistance. In some implementations, if the user match engine 240 does not receive a response for the message within a threshold amount of time, then the user match engine 240 identifies the next highest ranked user 170 among the identified set of users 170 and transfers a second message to that user 170. In some implementations, when the user match engine 240 receives a response for the message, then user match engine 240 transfers a message to the user 170 that sent the request for assistance to indicate that a user 170 associated with a different tier level is matched for the consultancy with the user 170.

At step 306, the user match engine 240 initiates the communication channel to enable the communication between the user 170 that sent the request for assistance and the user 170 associated with a different tier level that is matched with the user 170 that sent the request for assistance. At step 307, the user match engine 240 causes a communication user interface, such as a GUI, on a display of the client device 110 of the user 170 that sent the request for assistance and the client device 110 of the user 170 associated with a different tier level and matched with the user 170 that sent the request for assistance. In some implementations, the GUI displayed on the client device 110 is based on the mode of communication selected for the communication channel. For example, if mode of communication is video communication, then the users 170 that are communicating maybe displayed on the GUI. Similarly, if the mode of communication is audio communication, then one or more graphical icons for audio controls may be displayed on the GUI. At step 308, the server 130, using the user match engine 240 and the communication engine 242 receives and transmits messages between the users of the communication channel.

In some implementations, the server 130 may be configured to determine a quality score for a request for assistance based on the messages transferred between the users of the communication channel. In some implementations, one or more predetermined coded messages may be stored in a data storage unit of a server 130 or operably coupled to the server 130, and each of the one or more predetermined coded messages may be associated with a possible outcome for the assistance of the issue. For example, a predetermined coded message may be associated with the outcome that the issue was successfully resolved. Similarly, another predetermined coded message may be associated with the outcome that the issue was not successfully resolved. In some implementations, each request for assistance is associated with a base quality score, and the server 130 may be configured to update the quality score by increasing or decreasing the quality score based on the identified predetermined coded messages in the one or more messages. For example, in response to determining that a message includes the predetermined coded message that the issue has been resolved, the server 130 may update the quality score by increasing the quality score by a threshold amount. Similarly, in response to determining that a message includes the predetermined coded message that the issue has not been resolved, the server 130 may update the quality score by decreasing the quality score by a threshold amount. In some implementations, the server 130 may be configured to determine or update a quality score for the request for assistance based on satisfaction with the resolution by the player of the video game. For example, the server 130 may determine or update a quality score based on a response, such as a score or numerical value, provided by the player of the video game that indicates the satisfaction of the player with the provided resolution, and the server 130 may be configured to generate or update a quality score based on the response provided by the player of the video game.

Hardware Overview

Figure 4:
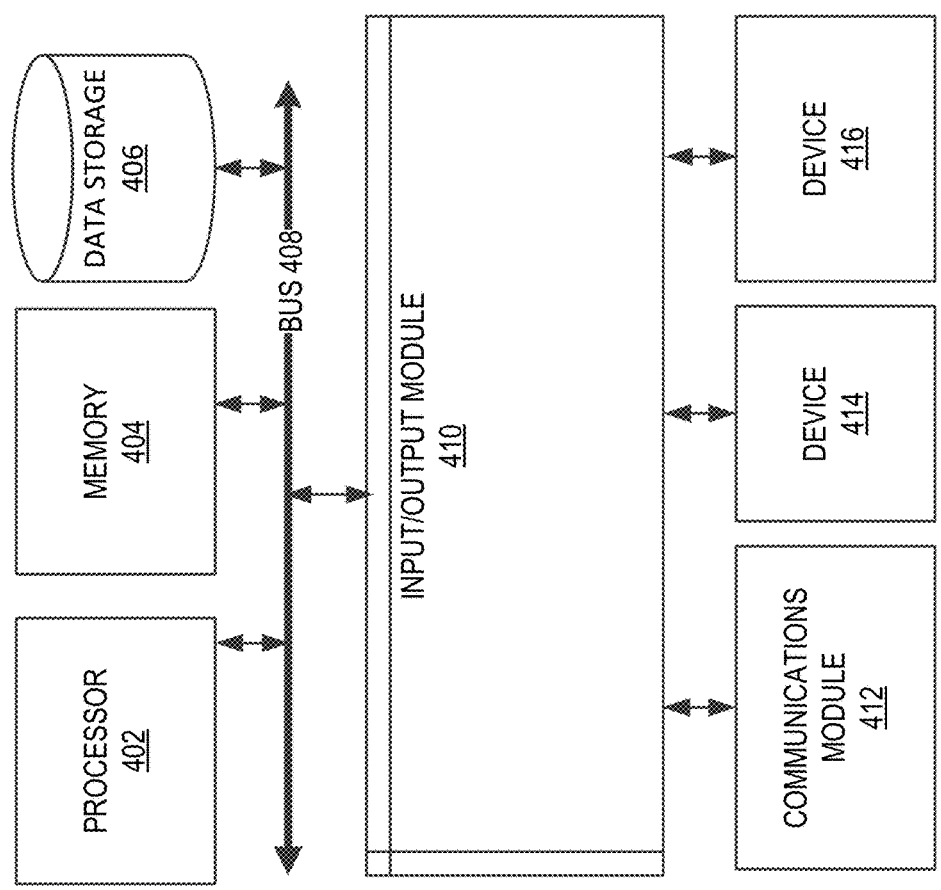
FIG. 4 is a block diagram illustrating an example computer system with which the clients and servers of FIG. 2 can be implemented.

FIG. 4 is a block diagram illustrating an example computer system 400 with which a client 110, such as client 110a, client 110b, client 110c, or client 110d, and a server 130, such as server 130a, and/or server 130b, of FIG. 2 can be implemented. In certain aspects, the computer system 400 may be implemented using hardware or a combination of software and hardware, either in a dedicated server, or integrated into another entity, or distributed across multiple entities.

Computer system 400 (e.g., client 110a, and server 130) includes a bus 408 or other communication mechanism for communicating information, and a processor 402 (e.g., processor 212, 252, 236) coupled with bus 408 for processing information. According to one aspect, the computer system 400 can be a cloud computing server of an IaaS that is able to support PaaS and SaaS services. According to one aspect, the computer system 400 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 400 may be implemented with one or more processors 402. Processor 402 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404 (e.g., memory 220, and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry. Expansion memory may also be provided and connected to computer system 400 through input/output module 410, which may include, for example, a SIMM (Single In Line Memory Module) card interface. Such expansion memory may provide extra storage space for computer system 400, or may also store applications or other information for computer system 400. Specifically, expansion memory may include instructions to carry out or supplement the processes described above, and may include secure information also. Thus, for example, expansion memory may be provided as a security module for computer system 400, and may be programmed with instructions that permit secure use of computer system 400. In addition, secure applications may be provided via the SIMM cards, along with additional information, such as placing identifying information on the SIMM card in a non-hackable manner.

The instructions may be stored in the memory 404 and implemented in one or more computer program products, e.g., one or more modules of computer program instructions encoded on a computer readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, with languages, embeddable languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices (e.g., input device 216, output device 214). The input/output module 410 can be any input/output module. Example input/output modules 410 include data ports such as USB ports. In addition, input/output module 410 may be provided in communication with processor 402, so as to enable near area communication of computer system 400 with other devices. The input/output module 410 may provide, for example, wired communication in some implementations, or wireless communication in other implementations, and multiple interfaces may also be used. The input/output module 410 is configured to connect to a communications module 412. Example communications modules 412 (e.g., communications module 218, 258, and 238) include networking interface cards, such as Ethernet cards and modems.

The components of the system can be interconnected by any form or medium of digital data communication (e.g., a communication network). The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 412 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 412 sends and receives electrical, electromagnetic, or optical signals that carry digital data streams representing various types of information. The network link typically provides data communication through one or more networks to other data devices. For example, the network link of the communications module 412 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 412, which carry the digital data to and from computer system 400, are example forms of transmission media.

Computer system 400 can send messages and receive data, including program code, through the network(s), the network link, and communications module 412. In the Internet example, a server might transmit a requested code for an application program through the Internet, the ISP, the local network, and communications module 412. The received code may be executed by processor 402 as it is received, and/or stored in data storage 406 for later execution.

In certain aspects, the input/output module 410 is configured to connect to a plurality of devices, such as an input device 414 (e.g., input device 216) and/or an output device 416 (e.g., output device 214). Example input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 416 include display devices, such as an LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 416 may comprise appropriate circuitry for driving the output device 416 to present graphical and other information to a user.

According to one aspect of the present disclosure, the client 110A can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. Processor 402 may process the executable instructions and/or data structures by remotely accessing the computer program product, for example by downloading the executable instructions and/or data structures from a remote server through communications module 412 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 402 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 406. Volatile media include dynamic memory, such as memory 404. Transmission media include coaxial cables, copper wire, and fiber optics, including the wires that comprise bus 408. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 408. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method comprising:
   receiving, from a device of a first user, an input indicating a request for assistance for an issue occurring in a video game,
      wherein the first user is associated with a first tier level, and the input provided via text boxes of a graphical user interface (GUI) of a consultation bot application on the device, the GUI being displayed based on a mode of communication comprising at least one of audio or video, and
      wherein graphical icons of the GUI comprise audio controls when the mode of communication is via audio and users that are communicating are displayed when the mode of communication is via video;
   determining a category associated with the request for assistance, wherein the category is associated with an aspect of gameplay of the video game, the category comprising at least one of in-game transactions, video game aspects, rules of the video game, and/or technology of the video game;

determining a sub-category associated with the category, the sub-category comprising at least one of hacked account, managing security settings, changing or recovering password, changing email address, purchases made, redemption of offline or online code, and/or player identity management;

for each second-user in a plurality of second-users, determining whether a score associated with a second-user in the plurality of second-users for the category and the sub-category satisfies a threshold score, wherein each second-user in the plurality of second-users is associated with a different tier level than the first user; and in response to determining that the score satisfies the threshold score:

adding the second-user in the plurality of second-users to a set of second-users;

storing the set of second-users in a circular data buffer implemented as a round robin;

selecting a first second-user from the set of second-users based on an availability of the first second-user within the circular data buffer according to the round robin;

initiating a communication channel between the first user and the first second-user;

transferring one or more messages between the first user and the first second-user;

generating, based on the one or more messages transferred between the first user and the first second-user, a coded message associated with an outcome for the request for assistance of the issue; and generating, based on the one or more messages transferred between the first user and the first second-user, a quality score for the request for assistance, the quality score being based at least in part on the coded message.

2. The computer-implemented method of claim 1, further comprising:

determining whether the one or more messages indicate that the issue is resolved;

in response to determining that the one or more messages indicate that the issue is resolved:

increasing the quality score by a threshold amount; and in response to determining that the one or more messages do not indicate that the issue is resolved:

decreasing the quality score by the threshold amount.

3. The computer-implemented method of claim 1, further comprising:

ranking, based on the score for the category, the set of second-users.

4. The computer-implemented method of claim 3, wherein the first second-user is selected based on a rank of the first second-user within the ranked set of the second-users.

5. The computer-implemented method of claim 3, further comprising:

for each second-user in the set of second-users, determining whether a number of open consultancies associated with a second-user in the set of second-users satisfies a threshold number of open consultancies; and in response to determining that the number of open consultancies associated with the second-user in the set of second-users satisfies the threshold number of open consultancies, lowering a rank associated with the second-user in the set of second-users relative to another second-user in the set of second-users.

6. The computer-implemented method of claim 1, further comprising:

identifying a second second-user from the set of second-users;

sending a message to the second second-user indicating a selection for a consultancy with the first user;

determining whether a response from a client device of the second second-user is received within a threshold time; and in response to determining that the response from the client device of the second second-user is not received within the threshold time:

selecting the first second-user from the set of second-users.

7. The computer-implemented method of claim 6, wherein a response from a client device of the first second-user is received within the threshold time.

8. The computer-implemented method of claim 1, further comprising:

determining whether a score associated with a previous interaction for a different request for assistance between the first second-user and the first user satisfies the threshold score; and in response to determining that the score associated with the previous interaction does not satisfy the threshold score:

selecting a second second-user from the set of second-users;

initiating a different communication channel between the first user and the second second-user; and transferring messages between the first user and the second second-user.

9. The computer-implemented method of claim 8, wherein a score associated with a previous interaction for a different request for assistance between the second second-user and the first user satisfies the threshold score.

10. A system comprising:

a memory storing sequences of instructions; and a processor configured to execute the sequences of instructions, which, when executed, cause the processor to perform:

receiving, from a device of a first user, an input indicating a request for assistance for an issue occurring in a video game, wherein the first user is associated with a first tier level, and the input provided via text boxes of a graphical user interface (GUI) of a consultation bot application on the device, the GUI being displayed based on a mode of communication comprising at least one of audio or video, and wherein graphical icons of the GUI comprise audio controls when the mode of communication is via audio and users that are communicating are displayed when the mode of communication is via video;

determining a category associated with the request for assistance, wherein the category is associated with an aspect of gameplay of the video game, the category comprising at least one of in-game transactions, video game aspects, rules of the video game, and/or technology of the video game;

determining a sub-category associated with the category, the sub-category comprising at least one of hacked account, managing security settings, changing or recovering password, changing email address, purchases made, redemption of offline or online code, and/or player identity management;

selecting, based on the category and the sub-category associated with the request for assistance, a set of second-users from a plurality of second-users,
wherein each second-user in the plurality of second-users is associated with a different tier level than the first user;

ranking the set of second-users;

storing the set of second-users in a circular data buffer implemented as a round robin;

selecting a first second-user from the ranked set of second-users based on an availability of the first second-user within the circular data buffer according to the round robin;

initiating a communication channel between the first user and the first second-user;

transferring one or more messages between the first user and the first second-user;

generating, based on the one or more messages transferred between the first user and the first second-user, a coded message associated with an outcome for the request for assistance of the issue; and generating, based on the one or more messages transferred between the first user and the first second-user, a quality score for the request for assistance, the quality score being based at least in part on the coded message.

11. The system of claim 10, further comprising the stored sequences of instructions, which, when executed by the processor, cause the processor to perform:
determining whether the one or more messages indicate that the issue is resolved;
in response to determining that the one or more messages indicate that the issue is resolved:
increasing the quality score by a threshold amount; and
in response to determining that the one or more messages do not indicate that the issue is resolved:
decreasing the quality score by the threshold amount.

12. The system of claim 10, further comprising the stored sequences of instructions, which, when executed by the processor, cause the processor to perform:
for each second-user in the plurality of second-users, determining whether a score associated with a second-user for the category satisfies a threshold score; and
in response to determining that the score satisfies the threshold score:
adding the second-user to the set of second-users.

13. The system of claim 12, further comprising the stored sequences of instructions, which, when executed by the processor, cause the processor to perform:
ranking the set of second-users based on the score for the category.

14. The system of claim 10, wherein the first second-user is selected based on a rank of the first second-user within the ranked set of second-users.

15. The system of claim 10, further comprising the stored sequences of instructions, which, when executed by the processor, cause the processor to perform:
for each second-user in the set of second-users, determining whether a number of open consultancies associated with a second-user in the set of second-users satisfies a threshold number of open consultancies; and in response to determining that the number of open consultancies associated with the second-user in the set of second-users satisfies the threshold number of open consultancies, lowering a rank associated with the second-user in the set of second-users relative to another second-user in the set of second-users.

16. The system of claim 10, further comprising the stored sequences of instructions, which, when executed by the processor, cause the processor to perform:
identifying a second second-user from the set of second-users;
sending a message to the second second-user indicating a selection for a consultancy with the first user;
determining whether a response from a client device of the second second-user is received within a threshold time; and
in response to determining that the response from the client device of the second second-user is not received within the threshold time:
selecting the first second-user from the set of second-users.

17. The system of claim 16, wherein a response from a client device of the first second-user is received within the threshold time.

18. The system of claim 10, further comprising the stored sequences of instructions, which, when executed by the processor, cause the processor to perform:
determining whether a score associated with a previous interaction for a different request for assistance between the first second-user and the first user satisfies a threshold score; and
in response to determining that the score does not satisfy the threshold score:
selecting a second second-user from the set of second-users;
initiating a different communication channel between the first user and the second second-user; and
transferring messages between the first user and the second second-user.

19. The system of claim 18, wherein a score associated with a previous interaction for a different request for assistance between the second second-user and the first user satisfies the threshold score.

20. A non-transitory machine-readable storage medium comprising machine-readable instructions, which when executed by a processor, cause the processor to perform a method comprising:
receiving, from a device of a first user, an input indicating a request for assistance for an issue occurring in a video game,
wherein the first user is associated with a first tier level, and the input provided via text boxes of a graphical user interface (GUI) of a consultation bot application on the device, the GUI being displayed based on a mode of communication comprising at least one of audio or video, and
wherein graphical icons of the GUI comprise audio controls when the mode of communication is via audio and users that are communicating are displayed when the mode of communication is via video;
determining a category associated with the request for assistance,
wherein the category is associated with an aspect of gameplay of the video game, the category comprising at least one of in-game transactions, video game aspects, rules of the video game, and/or technology of the video game;

determining a sub-category associated with the category, the sub-category comprising at least one of hacked account, managing security settings, changing or recovering password, changing email address, purchases made, redemption of offline or online code, and/or player identity management;

for each second-user in a plurality of second-users, determining whether a score associated with a second-user for the category and the sub-category satisfies a threshold score, wherein each second-user is associated with a different tier level than the first user; and in response to determining that the score satisfies the threshold score:
    adding the second-user to a set of second-users;
    storing the set of second-users in a circular data buffer implemented as a round robin;
    ranking the set of second-users based on the score for the category associated with the second-user in the set of second-users;
    selecting a first second-user from the ranked set of second-users based on an availability of the first second-user within the circular data buffer according to the round robin;

initiating a communication channel between the first user and the first second-user;

transferring one or more messages between the first user and the first second-user;

generating, based on the one or more messages transferred between the first user and the first second-user, a coded message associated with an outcome for the request for assistance of the issue; and generating, based on one or more messages transferred between the first user and the first second-user, a quality score for the request for assistance, the quality score being based at least in part on the coded message.

\* \* \* \* \*